May 23, 1933. A. R. BULLOCK 1,910,320

OVERSPEED DRIVE RELEASE MECHANISM

Filed Nov. 24, 1930

Inventor
Arthur R. Bullock
Kwis Hudson & Kent
attys

Patented May 23, 1933

1,910,320

UNITED STATES PATENT OFFICE

ARTHUR R. BULLOCK, OF LAKEWOOD, OHIO, ASSIGNOR, BY DIRECT AND MESNE ASSIGNMENTS, OF ONE-HALF TO WILLIAM J. McNAMARA, AND ONE-HALF TO DAVID J. BROPHY, BOTH OF LAKEWOOD, OHIO

OVERSPEED DRIVE RELEASE MECHANISM

Application filed November 24, 1930. Serial No. 497,657.

This invention relates to power transmission mechanisms of the type employed in motor vehicles, and more particularly to a transmission mechanism of this kind in which the speed of rotation of the member to be driven may at times exceed the speed of rotation of the driving means.

An object of this invention is to provide an improved and simplified transmission mechanism of the kind mentioned.

Another object of this invention is to provide a transmission mechanism of the kind mentioned having a novel arrangement of shaft members and cooperating clutch members associated therewith for transmitting power to a driven member.

A further object of this invention is to provide a transmission mechanism in which concentric shaft members extending into a casing are adapted respectively for direct and indirect driving connection with a driving member in said casing and are also adapted for driving connection with a member to be driven through clutch means located exteriorly of the casing.

Still another object of this invention is to provide transmission mechanism having inner and outer shaft members adapted, respectively, for direct and indirect connection with a driving member, in which an overrunning clutch connects the inner shaft member with a member to be driven, and in which means including a part of said clutch, connects the outer shaft member to the member to be driven.

The invention may be further briefly summarized as consisting in certain novel combinations and arrangements of parts hereinafter described and particularly set out in the appended claims.

In the accompanying sheet of drawing.

Figure 1:
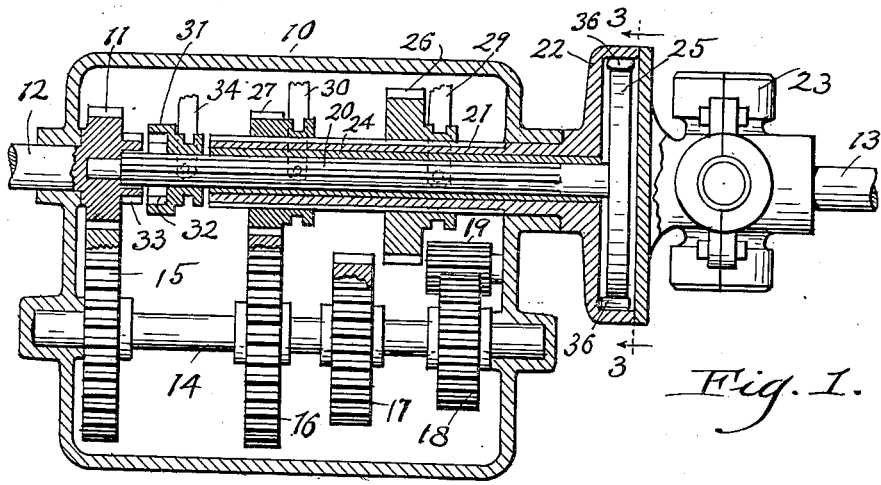
Figure 1 is a vertical sectional view showing power transmission mechanism embodying my invention.
Figure 3:
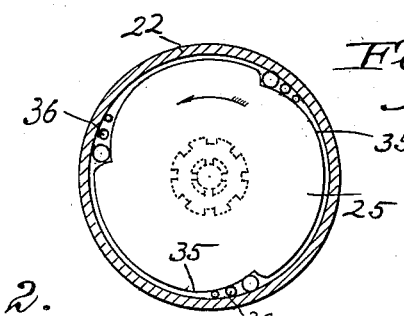
Fig. 3 is a sectional view taken on line 3—3 of Fig. 1.

In the drawing to which detailed reference will presently be made, I have shown a power transmission mechanism as representing one structural embodiment of the principle of my invention but, before proceeding with a detailed description thereof, it should be understood that that principle may also be embodied in other structural forms.

My transmission mechanism is provided with a casing 10 which houses the gearing, and which in shape and general form, corresponds substantially with the casings of mechanisms of this type which have been used heretofore. At one end of the casing a driving member in the form of the spur gear 11, is carried by a shaft 12 which extends through the end wall of the casing and which is adapted to be driven from any suitable source of power, such as the internal combustion engine of a motor vehicle. A member to be driven, such as a propeller shaft 13, extends from the opposite end of the casing at a point in substantial axial alignment with the shaft 12. The usual countershaft 14 is journalled in the end walls of the casing 10 so as to extend in spaced parallel relation with the extended axis of shaft 12, and is provided with a spur gear 15 which permanently meshes with the spur gear 11. For transmitting power to the propeller shaft 13 in the same direction but at different speeds the countershaft 14 is provided with spur gears 16 and 17 which are of different diameters. For transmitting power to the propeller shaft in a reverse direction, the countershaft 14 is provided with a spur gear 18 which permanently meshes with an idler 19 supported from the rear wall of the casing 10.

For transmitting power to the propeller shaft from the spur gear 11, or from the spur gears 16, 17 and 18, I provide respectively the concentric shaft members 20 and 21 which extend through the rear wall of the casing 10 in axial alignment with the shaft 12. The outer shaft member is connected to the casing member 22, which as hereinafter explained constitutes a clutch member and which in turn, is connected to the propeller shaft by means of the universal joint 23. The inner shaft member is rotatable in the bushing 24, arranged within the outer shaft member, and is connected to a clutch member 25 which, as hereinafter explained, is adapted to cooperate with the casing 22 to establish a driving connection between the inner shaft and the propeller shaft.

For operatively connecting the outer shaft with the countershaft 14 I provide spur gear members 26 and 27 of different diameters which are splined to this shaft and adapted to be moved axially thereof by the respective fork members 29 and 30. These fork members engage in grooves provided in the gear members and are adapted to be manipulated in the usual way by a suitable gear shift lever (not shown). The gear member 26 when moved axially of the outer shaft 21 to mesh with the spur gear 17 causes the outer shaft to be rotated in the ahead direction at a relatively low speed. When this spur gear is moved axially of the outer shaft in the opposite direction to mesh with the idler pinion 19, the outer shaft is rotated in the reverse direction. When the spur gear 27 is shifted axially of the outer shaft 21 into mesh with the spur gear 16, the outer shaft is driven in the ahead direction at a speed somewhat faster than the speed obtained when the spur gear 26 meshes with the spur gear 17. It will be seen from the arrangement thus far described that power transmitted from the shaft 12 to the outer shaft 21 through the countershaft and associated gearing or, in other words, the power transmitted indirectly from the shaft 12 to the outer shaft 21, is, in turn, transmitted to the propeller shaft 13 through the casing 22 and the universal joint 23.

When power is to be transmitted to the shaft 13 in an ahead direction at a speed greater than that produced by the cooperation of the spur gear 27 with the spur gear 16, the member 31 which is splined to the inner shaft member 20, is shifted axially of this shaft member to establish a direct driving connection between the latter and the shaft 12. The member 31 is formed with spaced teeth 32 which intermesh with the spaced teeth 33 of the spur gear 11 when this member is moved toward the spur gear. The member 31 is also provided with an annular groove which receives the prongs of a shifting lever 34 which is adapted to be actuated by the gear shift lever. If desired, the forward end of the inner shaft 20 may be journalled in a recess provided in the shaft 12, as shown in Fig. 1. It will be seen from the arrangement just described that when the member 31 is moved axially of the inner shaft 20 into engagement with the spur gear 11 a direct driving connection has been established between the inner shaft and the shaft 12. The power transmitted to the inner shaft by this direct driving connection is in turn transmitted to the propeller shaft 13 through the clutch member 25 cooperating with the casing 22.

Figure 2:
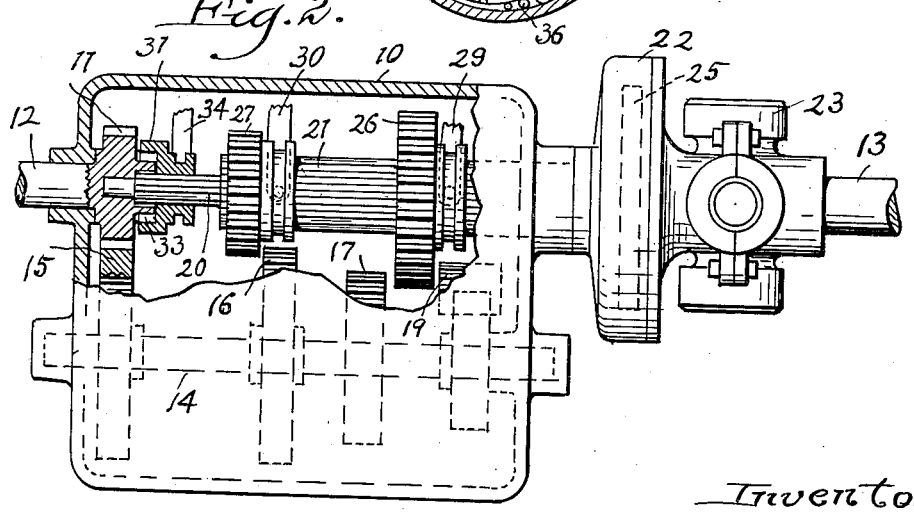
Fig. 2 is a similar sectional view of the same transmission mechanism, but showing the parts thereof as having been shifted to another position.

It will be understood, of course, that as in the usual operation of transmission mechanisms of this kind, when one of the sliding members is moved to mesh with its cooperating member the other sliding members will be out of mesh. In the device as illustrated in Fig. 1 the relation of the parts is such that power is being transmitted indirectly at an intermediate speed through the countershaft 14 the sliding gear 27, the outer shaft 21, and the casing 22. In the device as illustrated in Fig. 2 the arrangement of parts is such that power is being transmitted to the inner shaft 20 directly through the member 31 or, in other words, without gear reduction.

As already indicated, the members 22 and 25 constitute a clutch means for transmitting power to the propeller shaft from the concentric shafts 20 and 21. The member 22 constitutes the casing of the clutch means and also forms a direct connection between the outer shaft and the universal joint 23. The member 25 which is secured to the inner shaft 20 is constructed in the form of a clutch disc having circumferentially spaced notches 35 in its periphery. Sets of roller members 36 are provided in each notch and establish a driving connection between the casing 22 and the member 25 when the latter is driven in one direction, but cause this connection to be released when the member 25 is rotated in the opposite direction, or when the propeller shaft 13 tends to act as a driving member instead of a driven member, which would of course be whenever the speed of rotation of the propeller shaft exceeds the speed of rotation of the member 25. From the arrangement just described, it will be seen that the members 22 and 25 constitute an overrunning clutch when power is being transmitted to the propeller shaft 13 by the inner shaft 20, and that the casing 22 of this clutch forms a direct connection for transmitting power to the propeller shaft by the outer shaft 21.

It will now be readily understood that I have provided a simple and efficient form of power transmission means involving the use of an overrunning or slip clutch when the mechanism is shifted to high speed position. An important feature of the invention resides in the fact that an overrunning clutch connection is not established when power is being transmitted through low, intermediate, or reverse gearing arrangements but is established only when power is being transmitted when the parts are in high speed position. It will also be readily seen from the arrangement which I have provided that the construction of my device does not involve any radical departures in the shape, size or location of the casing as heretofore used to house mechanisms of this kind. Additionally it will be seen that in my arrangement the overrunning clutch can be located exteriorly of the casing so that it will be readily accessible and will not necessitate crowding of the gearing within the casing.

In the specification and claims I have used the word "clutch", and it should be understood that in using this word I employ it in its broader sense in which it means any of the readily releasable connections for transmitting power, such as ratchets, couplings or the like.

While I have illustrated and described the device of my invention in a detailed manner, it should be understood however that I do not intend to limit myself to the precise structural details and arrangements illustrated and described, but regard my invention as including such changes and modifications as do not involve a departure from the spirit of the invention and the scope of the appended claims.

Having thus described my invention, I claim:

1. In a power transmission the combination of driving means, concentric shaft members adapted respectively for direct and indirect driving connection with said driving means, a driven member, means non-releasably connecting said driven member with the indirectly driven shaft member and comprising a hollow clutch casing, and means actuated by the directly driven shaft member and cooperating with said casing to provide an overrunning clutch whereby said driven member is adapted to be driven by the directly driven shaft member when the speed of rotation of the latter is equal to the speed of rotation of the driven member.

2. In a power transmission the combination of driving means, concentric shaft members one of which is adapted to be directly driven by said driving means and the other of which is adapted to be indirectly driven by said driving means, a driven member, means for permanently connecting one of said shaft members with the driven member, and means cooperating with the last mentioned means to form an overrunning clutch for releasably connecting the other of said shaft members with said driven member.

3. In a power transmission mechanism the combination of a driving member, shaft members one of which is adapted to be directly driven by said driving member and the other of which is adapted to be indirectly driven by said driving member, a driven member, a clutch element connecting said driven member with the indirectly driven shaft member, and another clutch element adapted to cooperate with the first mentioned clutch element to establish a driving connection between said driven member and the directly driven shaft member, said clutch members together constituting an overrunning clutch whereby the driving connection of said directly driven shaft member with said driven member is adapted to be automatically interrupted when the speed of rotation of the latter exceeds the speed of rotation of the directly driven shaft member.

4. In a power transmission mechanism the combination of a driving member, shaft members one of which is adapted to be directly driven by said driving member and the other of which is adapted to be indirectly driven by said driving member, a driven member, a casing directly and non-releasably connecting said driven member with the indirectly driven shaft member, and means in said casing and cooperating therewith for establishing an automatically releasable driving connection between said driven member and the directly driven shaft member.

5. In a power transmission the combination of a driving member, a driven member, a hollow shaft having direct and non-releasable connection with said driven member, means for transmitting power to said hollow shaft from said driving member, a shaft extending through said hollow shaft and adapted for direct connection with said driving member, and clutch means housed in said non-releasable connection whereby said driven member is adapted to be driven by the second mentioned shaft.

6. In a power transmission mechanism the combination of a driving member, a member to be driven, inner and outer shaft members adapted respectively for direct and indirect driving connection with said driving member, an overrunning clutch for connecting the inner shaft member with the member to be driven, and means including a part of said clutch for non-releasably connecting said outer shaft member with the member to be driven.

7. In a power transmission mechanism the combination of a driving member, a member to be driven, inner and outer shaft members, means including a gear member slidable on the outer shaft member for indirectly connecting that shaft member with the driving member, means including a member slidable on the inner shaft member for directly connecting that shaft member with the driving member, and an overrunning clutch for operably connecting said shaft members with the member to be driven, said clutch comprising a casing establishing a non-releasable connection between said outer shaft member and said driven member, and means in said casing and cooperating therewith for establishing a releasable connection between the member to be driven and said inner shaft member.

8. In a power transmission the combination of a casing, a driving member extending into said casing, a countershaft adapted to be rotated by said driving member, said countershaft having a plurality of driving members thereon, a hollow shaft having means thereon for selective cooperation with the driving members of said countershaft, driven means direct-connected to said hollow shaft, an inner shaft extending through said hollow shaft and adapted for direct connection with the first mentioned driving member, and an overrunning clutch through which said driven means is adapted to be driven by said inner shaft.

In testimony whereof, I hereunto affix my signature.

ARTHUR R. BULLOCK.